United States Patent
Stump

Patent Number: 6,094,855
Date of Patent: Aug. 1, 2000

[54] ARTIFICIAL FISHING LURE WITH LONGITUDINAL ROWS OF RESILIENTLY FLEXIBLE RIB-LIKE PROJECTIONS

[76] Inventor: Gregory J. Stump, 395 Blackhawk Dr., Newbury Park, Calif. 91320

[21] Appl. No.: 09/100,901

[22] Filed: Jun. 18, 1998

Related U.S. Application Data

[60] Provisional application No. 60/050,129, Jun. 18, 1997.

[51] Int. Cl.[7] .................................................. A01K 85/00
[52] U.S. Cl. ........................................ 43/42.24; 43/42.28
[58] Field of Search ............................... 43/42.09, 42.24, 43/42.28, 42.32, 42.31, 42.26, 42.27

[56] References Cited

U.S. PATENT DOCUMENTS

| | | | |
|---|---|---|---|
| D. 368,512 | 4/1996 | Coggins et al. ........................ | D22/128 |
| 3,983,656 | 10/1976 | Bain ........................................ | 43/42.24 |
| 4,069,610 | 1/1978 | Firmin ..................................... | 43/42.24 |
| 4,709,501 | 12/1987 | Garst ....................................... | 43/42.24 |

*Primary Examiner*—Robert P. Swiatek
*Assistant Examiner*—Son T. Nguyen
*Attorney, Agent, or Firm*—William E. Noonan

[57] ABSTRACT

An artificial fishing lure includes multiple rows of resiliently flexible projections. The lure includes a head portion, a tail portion and a body portion that unitarily interconnects the head portion and the tail portion. The resiliently flexible projections are attached to and extend from the body portion. As the lure is pulled underneath the water or while contacting underwater objects, the projections vibrate to produce sound waves and modulated reflected and refracted light, which attract fish. Additionally, the vibrating projections trap air bubbles to further attract predatory fish.

17 Claims, 2 Drawing Sheets

ARTIFICIAL FISHING LURE WITH LONGITUDINAL ROWS OF RESILIENTLY FLEXIBLE RIB-LIKE PROJECTIONS

RELATED APPLICATION

This application is a continuation in part of U.S. Provisional Patent Application Ser. No. 60/050,129 filed Jun. 18, 1997.

FIELD OF THE INVENTION

This invention relates to an artificial fishing lure and, more particularly, to a lure having a lure body and one or more rows of integrally attached projections that vibrate as the lure is pulled through the water to attract fish.

BACKGROUND OF THE INVENTION

Fishermen presently use a wide variety of artificial fishing lures to attract fish. Such lures typically feature characteristics such as movement and scent that are designed to simulate natural prey. The lure industry is continuously attempting to develop new synthetic lures that are increasingly attractive to fish. However, most known soft plastic lures do not optimally employ sound to attract fish. Other fish attracting features such as light reflection and refraction likewise are not widely used by soft plastic lures.

SUMMARY OF INVENTION

It is therefore an object of the present invention to provide an artificial soft plastic fishing lure that exhibits significantly improved attractiveness to fish of various types.

It is a further object of this invention to provide an artificial fishing lure that attracts fish by emitting unique sound wave patterns.

It is a further object of this invention to provide an artificial fishing lure that attracts fish by modulated light reflection and refraction.

It is a further object of this invention to provide a lure that produces and emits air bubbles that assist in attracting fish.

It is a further object of this invention to provide a lure that works simply and effectively in virtually all water conditions and clarifies.

This invention features an artificial or synthetic fishing lure having a head portion, a tail portion and a lure body unitarily interconnecting the head portion and the tail portion. There are first and second rows of resiliently flexible rib-like projections formed along and extending from opposing sides of the lure body. Each of the resiliently flexible projections has a generally flat or planar shape and, in an unflexed condition, extends generally radially or perpendicularly outwardly from the longitudinal axis of the lure body. As the lure is pulled through the water and engages underwater objects, the projections are deflected and vibrate to produce a series of low frequency sound waves or pulses through the water. These sound waves simulate natural sounds that are attractive to predatory fish. Such vibrations and deflections also modulate the light passing in the vicinity of the lure as such light is reflected and refracted by the projections. This modulation or flickering produces lighting effects, which attract feeding , predatory fish.

In a preferred embodiment, the resiliently flexible projections may comprise a series of generally planar flaps. The flaps may include rounded outer edges. Preferably, the flaps are formed along respective sides of the lure body. The lure may include a pair of channels that are typically formed along the tops and the bottoms of the lure between the respective rows of projections. The tail portion of the lure may include a curved or spiral shaped element that is unitarily attached to the lure body. Alternatively, the tail may include means defining one or more fins unitarily attached to a rearward end of the lure body. In certain versions the rows of resiliently flexible projections may continue along respective sides of the tail portion.

The shape, pitch and number of resiliently flexible projections may be varied in accordance with this invention. Typically, at least a six projections are formed on each of the respective sides of the lure body. As the lure is cast into the water, the space between the projections tends to trap air therebetween. Such trapped air departs the lure in the form of bubbles, which further aid in attracting fish. Some of those bubbles remain on the surface of the projections and provide still further visual stimuli for predatory fish.

The configuration of the rows of flexible projections may also be varied. In a preferred embodiment, the preferred projections progressively increase in length from the head and the tail toward an intermediate portion of the body.

DETAILED DESCRIPTION OF PREFERRED EMBODIMENTS

Other objects, features and advantages will occur from the following description of preferred embodiments and the accompanying drawings, in which.

Figure 1:
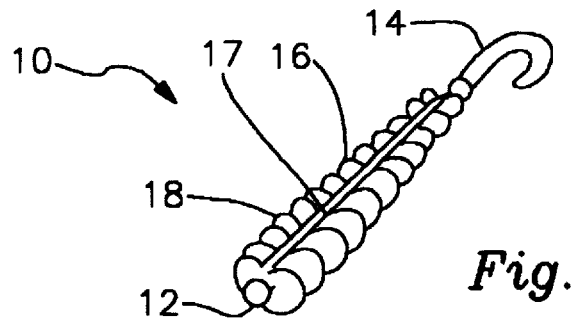
FIG. 1 is a perspective view of a preferred fishing lure in accordance with this invention.
Figure 2:
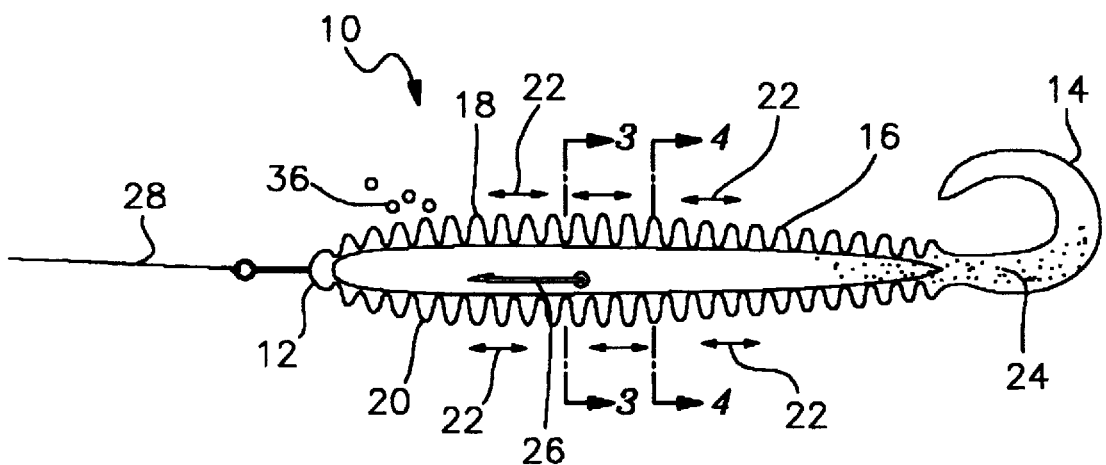
FIG. 2 is a top plan view of the artificial lure of FIG. 1 attached to a fish hook and line.
Figure 3:
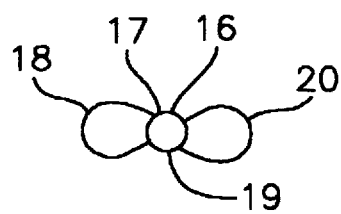
FIG. 3 is a cross sectional view of the lure taken along line 3—3 of FIG. 2.
Figure 4:
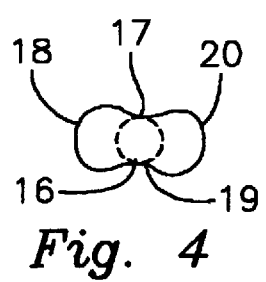
FIG. 4 is a cross sectional view of the lure taken along line 4—4 of FIG. 2.

There is shown in FIGS. 1 and 2 an artificial fishing lure 10. The lure is composed of a relatively soft molded plastic of the type commonly used for artificial fishing lures. A one-piece or unitary construction is utilized. Lure 10 includes a head portion 12, a generally curved or spiral tail portion 14 and an intermediate body portion 16. As shown in FIGS. 3 and 4, body portion 16 may have a generally circular, cross sectional shape, although various other non-circular shapes may be utilized. The lure may be manufactured in various sizes such as 3½ and 5½ inch lengths, although the precise length and weight are not limitations of this invention.

A first series of resiliently flexible rib-like projections 18 are unitarily connected to and extend from one side of body portion 16. A second series or row of resiliently flexible projections 20 similarly extend from an opposite side of body portion 16. Projections 18 and 20 are unitarily connected to body portion 16 and typically are formed with the rest of the lure in the molding process. The flaps or projections are arranged side by side in longitudinal rows on the lure body in a manner resembling ribs. A clearly discernible space is formed between each adjacent pair of projections. Opposing pairs of projections 18 and 20 are depicted in FIGS. 3 and 4. Each projection has a generally flat, planar or pancake-like shape with a rounded or convex outer edge. Each series of projections therefore resembles a spaced apart plurality of generally parallel flaps or fins. The projections 18 and 20 are shaped such that an upper channel 17 and a lower channel 19 are formed between the respective rows of projections 18 and 20. In alternative embodiments, the projections maybe formed along the top and bottom of body portion 16 or at other radial locations about the lure body. The number of projections employed in each row is not a limitation of this invention, although each row typically includes six or more projections. The opposing pairs of projections 18 and 20 progressively increase in length from head portion 12 and tail portion 14 such that the longest projections are formed at an intermediate point of body portion 16. The resiliently flexible material that composes the projections permits them to vibrate in a manner indicated by double-headed arrows 22, FIG. 2, when the projections engage underwater objects such as rocks, limbs, grass and plants. Light reflecting from or refracted by the vibrating projections modulates or flickers. This creates new and unique light effects not found in other conventional soft plastic lures. Such visual stimuli attracts nearby fish.

Lure 10 may include a light reflective particulate material 24, FIG. 2, that is dispersed through the lure. This material, which may include the glitter or sparkle-like particles that are used in artwork, tends to enhance the modulation effects of the reflected and refracted light when the light is pulled through the water. This causes the lure to be more attractive to fish.

Figure 5:
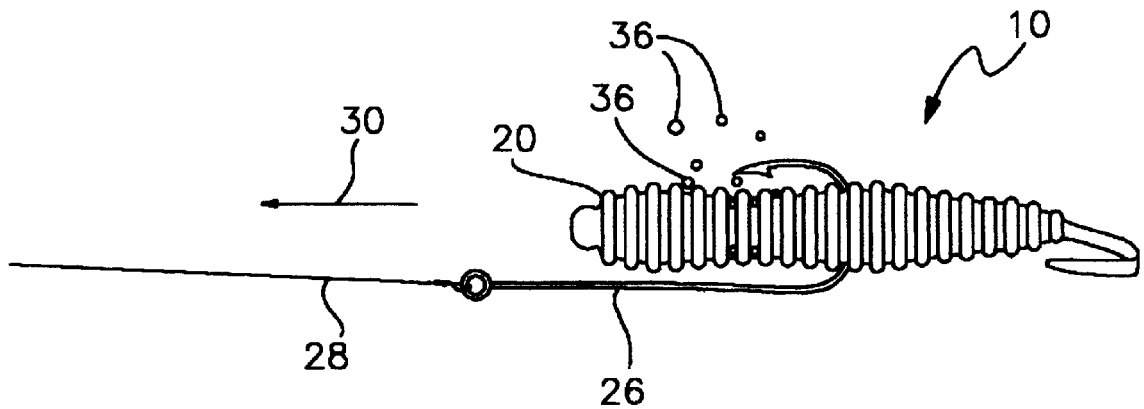
FIG. 5 is a side elevational view of the lure and attached hook and line.

Lure 10 is used by engaging body portion 16 with a standard fish hook 26, shown in FIGS. 2 and 5. Hook 26 is tied at the end of a fishing line 28. The lure is attached to the hook by various known techniques. The precise point at which hook 26 is engaged with lure 10 or the particular hooking technique that is used will be understood to those skilled in the art and are not limitations of this invention.

In operation, lure 10 is drawn through the water in the manner illustrated by arrow 30 in FIG. 5. As the lure brushes against underwater objects, projections 18 and 20 vibrate and may flap against one another in the manner illustrated by arrows 22 in FIG. 2. The projections deflect along the longitudinal axis of lure 10, resiliently spring back and sometimes strike one another to produce a series of unique frequency pulses or sound waves. These waves travel through the water and simulate naturally attractive sounds that predatory fish focus upon while they are feeding. As a result, the fish are attracted and drawn to the lure and apt to strike at the lure and be caught by the fisherman. The particular frequency of these vibrations can be modified somewhat by varying the size, shape and material of the projections 18 and 20.

In addition to the above-described sound waves, the deflection and vibration of planar projections 18 and 20 produces lighting effects that attract fish. In particular, the vibrating projections, as well as the particulate material disbursed in the body of the lure, cause modulated reflection and refraction of light. Such lighting effects act as additional stimuli for feeding fish.

As illustrated in FIGS. 2 and 5, when the projections 18 (not shown in FIG. 5) and 20 vibrate, air bubbles 36 are produced in the spaces between the adjacent projections. Some of these bubbles tend to cling onto the projections, which provides additional visual stimuli similar to the air bubbles that commonly attach to natural prey, such as crawdads. Eventually, some of these bubbles 38 are released from lure 10 and float toward the surface. These bubbles 38 too assist in attracting fish. It should be understood that various fish attracting scents, which will be know to those skilled in the art, may also be applied to lure 10 in a known manner. The rib-like projections also serve to conveniently and uniquely hold scent-inducing products to which fish may be attracted.

Figure 6:
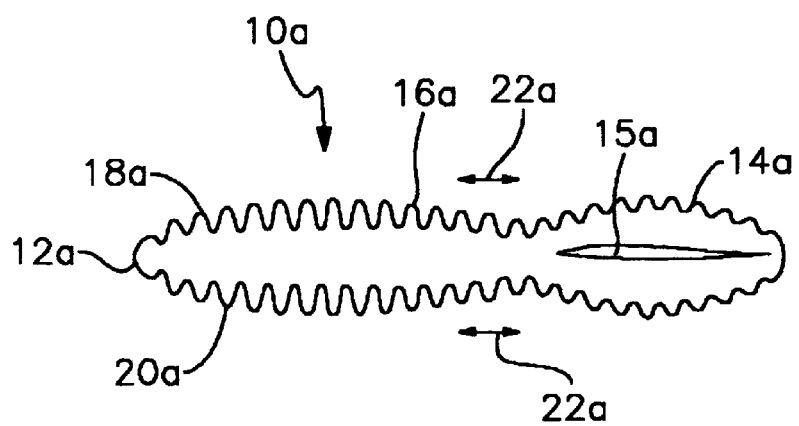
FIG. 6 is a top plan view of an alternative version of the artificial lure of this invention.

FIG. 6 depicts an alternative lure 10a according to this invention. This version employs a head portion 12a, a tail portion 14a and an intermediate body portion 16a. Once again, lure 10a comprises a one-piece, soft, plastic material that is molded and cut in accordance with various known techniques. In this version, tail portion 14a includes a central slit 15a that divides tail portion 14a into a pair of segments resembling tail fins of a natural prey. This central slit allows the fisherman to easily pull apart the halves of the tail if desired and form a split tail. To accomplish this, the fisherman tears the soft plastic of the tail along a centerline extending from the rearward end of slit 15a to the rearward tip of tail 14a.

In this embodiment, a first plurality of resiliently flexible projections 18a are formed along one side of lure 10a and a second series of resiliently flexible projections 20a are formed along the opposite side of the lure. The row of projections 18a extends from a point immediately adjacent head portion 12a, longitudinally along body portion 16a and continues along the length of tail portion 14a. Likewise, the row of projections 20a extends along the length of body portion 16a and tail portion 14a. Although the projections are depicted as being formed along the sides of the lure, they may alternatively be formed along the top and bottom of the lure or at various points radially about the body of the lure. The projections are connected to and extend from the body and tail of the lure in a manner analogous to that in the previously described embodiment.

The embodiment of FIG. 6 is utilized in a manner similar to the technique previously described. Specifically, lure 10a is engaged by a hook and pulled beneath the water. As the lure is pulled through the water and/or strikes underwater objects, projections 18a and 20a deflect and vibrate in a manner indicated by arrows 22a. This causes adjacent projections to flap in the water or into one another such that they produce low frequency sound waves through the water. Fish are thereby attracted to lure 10a. The vibrating projections also reflect and refract light to attract fish in the above described manner. Finally, the projections produce fish attracting bubbles in the manner described above. These fish attracting features are produced in virtually all conditions and clarity of water and help the fisherman to achieve significantly improved fishing results.

The flaps or projections disclosed herein also help to protect a hook that is attached to the lure in the manner of a Texas rig.

It will thus be seen that the objects made apparent from the preceding description are sufficiently obtained and certain changes may be made in the above construction without departing from the scope of the invention. It is intended that all matter contained in the above description and shown in the accompanying drawings be interpreted as illustrative and not in an imitative sense. Although specific features of the invention are shown in some drawings and not others, this is for convenience only as each feature may be combined with any or all of the features in accordance with the invention. Other embodiments, within the scope of this invention, will occur to those skilled in the art.

What is claimed is:

1. An artificial fishing lure comprising:

an elongate, one-piece lure body; and separate and distinct first and second rows of spaced apart, resiliently flexible flaps attached unitarily to said lure body and projecting outwardly therefrom, said first and second rows of flaps being formed along respective opposing sides of said lure body, each flap having a generally planar shape and said flaps in each said row being juxtaposed in a generally parallel arrangement, whereby pulling said lure body underwater in a generally longitudinal manner and against underwater objects causes said flaps to deflect, vibrate against one another and produce visual and aural stimuli that attract surrounding fish.

2. The lure of claim 1 in which said flaps include generally flat leading and trailing faces.

3. The lure of claim 1 in which said flaps have rounded outer edges.

4. The lure of claim 1 further including first and second channels formed longitudinally in respective opposite sides of said lure between said first and second rows of flaps.

5. The lure of claim 1 further including a tail portion unitarily attached to said lure body and extending longitudinally therefrom.

6. The lure of claim 5 in which said tail portion includes a generally spiral shaped element.

7. The lure of claim 5 in which said tail includes fins unitarily attached to a rearward end of the lure body.

8. The lure of claim 5 in which each said row of flaps extends along a respective side of said tail portion.

9. The lure of claim 1 in which each said row includes at least six projections.

10. The lure of claim 1 in which said flaps change in length from leading and trailing ends of said lure body toward an intermediate portion of said body.

11. The lure of claim 1 in which said lure body and said flaps comprise a soft plastic composition.

12. The lure of claim 1 further including a fish attracting scent accommodated between said flaps.

13. An artificial fishing lure comprising:

an elongate, one-piece lure body;

separate and distinct first and second rows of spaced apart, resiliently flexible flaps attached unitarily to said lure body and projecting outwardly therefrom, said first and second rows of flaps being formed along respective opposing sides of said lure body, each flap having a generally planar shape and said flaps in each said row being juxtaposed in a generally parallel arrangement; and first and second channels form longitudinally in respective opposite sides of said lure between said first and second rows of flaps, whereby pulling said lure body underwater in a generally longitudinal manner and against underwater objects causes said flaps to deflect, vibrate against one another and produce visual and aural stimuli that attract surrounding fish.

14. The lure of claim 13 in which each said flap includes a generally fan-like shape.

15. The lure of claim 13 in which each said flap is aligned and generally coplanar with a corresponding flap located in the other row and in which said aligned flaps extend outwardly from said lure body to form a generally figure-8 shaped configuration.

16. The lure body of claim 13 in which each said flap includes an inner edge that is directly connected to said lure body and a convex outer edge that is connected at respective ends thereof to said inner edge, said convex outer edge being substantially longer than said inner edge.

17. The lure of claim 13 further including an elongate tail unitarily connected to said lure body and including a central, longitudinal slit that facilitates splitting said tail along a center line that extends generally from a rearward end of said slit to a rearward tip of said tail to divide said tail into a pair of longitudinal portions.

* * * * *